3,703,547
METHOD OF PREPARING PHTHALIC ACIDS
Luigi Lugo, Milan, Giorgio Gualdi, Verona, and Cesare Reni, Busto Arsizio, Varese, Italy, assignors to Societá Italiana Resine S.p.A., Milan, Italy
No Drawing. Filed June 30, 1970, Ser. No. 51,318
Claims priority, application Italy, July 7, 1969, 19,282/69
Int. Cl. C07c 63/02
U.S. Cl. 260—524 R          5 Claims

ABSTRACT OF THE DISCLOSURE

A process for the catalytic oxidation of p-xylene to terephthalic acid, consisting in partially oxidising the p-xylene in an initial stage of the reaction, in the presence of metallic catalysts, and completing the oxidation reaction in a second stage carried out at a lower temperature than the first, in the presence of activators consisting of organic substances containing one or more keto groups in the molecule.

---

This invention relates to an improved method of preparing aromatic carboxylic acids and is concerned in particular with the preparation of phthalic acids by the oxidation of xylenes in liquid phase in the presence of catalysts.

Phthalic acids are extremely useful to industry.

Thus, for example, terephthalic acid, normally in diester form, is converted, in conjunction with glycols, into polymers utilised in the production of yarns.

There are various known methods of preparing aromatic carboxylic acids.

In one such process, for example, p-xylene is oxidised to form p-toluic acid, which is subjected to further oxidation after esterification of the carboxyl group, generally with methanol.

Other known methods involve the oxidation of xylenes to form the corresponding dicarboxylic acids, in the presence of an inert solvent and of catalysts consisting of salts of heavy metals.

With such methods, working in the presence of activators consisting generally of bromine or derivatives thereof, there are however conversions and selectivity in the reaction of oxidation at relatively low values; nor are better results obtained by the use of other activators such as, for instance, organic compounds having carbonyl groups in the molecule.

Thus, in some cases, the unconverted compounds are partially recovered by subjecting them to further oxidation, for example, by treatment with nitric acid.

In this way, however, the oxidation process becomes very burdensome, with obvious economic disadvantages.

It has now been found that it is possible to obtain terephthalic acid with extremely high rates of conversion and selectivity by a method consisting essentially in partially oxidising the p-xylene in an initial stage of the reaction, in the presence of metallic catalysts, and completing the oxidation reaction in a second stage carried out at a lower temperature than the first, in the presence of activators consisting of organic substances containing one or more ketone groups in the molecule.

In more precise terms, the method here proposed is carried out in the presence of aliphatic carboxylic acid, liquid in the conditions of reaction, and preferably in acetic acid, oxygen being supplied to the first stage of reaction in quantities equal to or slightly in excess of what is theoretically necessary to convert the p-xylene into p-toluic acid, oxidation then being completed in the second stage of reaction to form the terephthalic acid.

Thus, in the first stage of reaction, the oxidising gas, preferably air, is fed to a reaction medium comprising p-xylene, aliphatic carboxylic acid, an alkaline carboxylate and salts of heavy metals.

This stage is carried out, more particularly, at temperatures of 150° C. to 220° C. and pressures of up to 30 atmospheres or so, in conditions such that the initial weight ratio between the aliphatic carboxylic acid and the p-xylene lies between 2:1 and 6:1. The carboxylic acid used should preferably be acetic acid, the heavy metals consisting of cobalt or manganese, preferably in halide or acetate form.

These catalytic salts are used in quantities of 0.1% to 5.0% by weight related to the p-xylene and preferably between 0.15% and 3.0%, while the alkali metal carboxylate, preferably sodium acetate, is used in quantities of 0.05% to 2.0% by weight related to the p-xylene.

As already stated, there is only partial oxidation during the first stage of reaction, and in particular the amount of oxidising gas supplied is equal to or up to 30% in excess of what is theoretically required for converting the p-xylene into p-toluic acid.

The second stage of reaction is carried out at temperatures at least 30 deg. C. below those used in the first stage, and preferably from 80 to 130 deg. C. lower, whereas the pressure is maintained at the levels stated for the first stage.

During the second stage, moreover, the amount of aliphatic carboxylic acid is maintained at 6 to 12 times by weight in relation to the quantity of p-xylene supplied to the first stage of reaction, the work being carried out in the presence of an organic substance containing one or more ketone groups, to the extent of 1% to 15% by weight in relation to the quantity of p-xylene supplied.

The ketone compound to be preferred is methyl ethyl ketone.

In one recommended form of the present invention, the ketone compounds are fed to the second stage of reaction along with the carboxylic acid. In this way, the reaction temperature is kept under control.

The oxidising gas to be employed should preferably be oxygen (or a gas having an oxygen content of more than 90%), which is fed to the second stage in sufficient quantity to complete the reaction for the formation of terephthalic acid.

In all cases, conditions should preferably be such as to ensure that the gases discharged from the reaction vessel contain from 1% to 5% of oxygen.

When the process is carried out in the conditions described, the amount of p-xylene converted to terephthalic acid, in mols, amounts to 94% or more.

Moreover, the oxidation produces a crude acid that does not require complicated methods of purification to yield a product ready for use for the purposes for which it is normally employed.

The process based on the principle of the invention can be carried out discontinuously or (preferably) continuously. In the case of continuous working, reaction vessels of elongated shape are used.

The p-xylene and carboxylic acid and the catalyst consisting of heavy metal are fed in at the top of the vessel.

Air is fed to a point intermediate between the top and the base of the vessel, to maintain the oxygen content within the limits already defined.

Somewhere along the body of the vessel, below the air inlet, the ketone compound is introduced, along with any further quantities of acetic acid.

Finally, at the base of the reaction vessel, oxygen is fed in and the reaction products, from which the terephthalic acid is extracted, are removed.

EXAMPLE 1

For this experiment, use was made of an elongated tubular reaction vessel of about 15 litres capacity, equipped with agitation, heat-exchange jacket and arrangements for introducing the reagents and removing the reaction products.

The top of the vessel was fitted with facilities for condensing and re-cycling condensable products.

A baffle, of section such as to permit the passage of fluid, was also provided, being fitted horizontally about half-way down the vessel.

This baffle formed the boundary between an upper (first stage) reaction zone and a lower (second stage) zone.

The following were admitted continuously to the top of the vessel: p-xylene, 1 kg./hour; acetic acid (98% conc.), 5.5 kg./hour; and 25 g./hour of cobalt bromide and 18 g./hour of sodium acetate, these salts being supplied in the form of concentrated aqueous solutions.

Immediately above the baffle, air was fed in at the rate of 1,900 N. litres/hour. The first stage was carried out at a temperature of about 180° C. and a pressure of 10 kg./sq. cm.

Immediately below the baffle, a mixture was fed in consisting of acetic acid (98% conc.) at 3 kg./hour and methyl ethyl ketone at 130 g./hour. The second stage of reaction was carried out at a temperature of about 120° C. and at the same pressure as the first stage, commercial oxygen (95%) being fed to the base of the vessel at the rate of 300 N. litres/hour.

The reaction products were removed continuously from the base of the vessel and from these the terephthalic acid recovered was washed with water and acetic acid.

By this means, 1.5 kg./hour of purified terephthalic acid was obtained.

EXAMPLE 2 (COMPARATIVE)

The same procedure was followed as in Example 1, except that no methyl ethyl ketone was admitted and the temperature was held at about 180° C. in both stages of reaction.

By this means, 1.37 kg./hour of fairly impure terephthalic acid was obtained after washing.

What we claim is:

1. A process for the catalytic oxidation of p-xylene in the liquid phase to form terephthalic acid which comprises:
    (a) feeding air into a first stage containing a reaction mixture consisting essentially of:
        (1) p-xylene,
        (2) acetic acid,
        (3) a catalysis salt consisting essentially of cobalt or manganese, said salt being an acetate or halide, present in an amount of between 0.1% to 5.0% by weight based on the weight of p-xylene, and
        (4) an alkali metal acetate present in the amount of 0.05% to 2.0% by weight based on the weight of p-xylene
    which is maintained at a temperature of 150° C. to 220° C. and at a pressure of up to 30 atmospheres wherein the initial weight ratio of acetic acid to p-xylene is between 2:1 and 6:1 and wherein said air is supplied in quantities such that the oxygen level is equal to or up to 30% in excess of what is theoretically required to convert the p-xylene and p-toluic acid; and
    (b) feeding oxygen or a gas containing more than 90% of oxygen into a second stage containing:
        (1) the partially reacted mixture derived from the first stage,
        (2) methyl ethyl ketone, said methyl ethyl ketone being present in the amount of 1% to 15% by weight based on the weight of p-xylene admitted, and
        (3) an additional quantity of acetic acid, said quantity of acetic acid being by weight 6 to 12 times the amount of p-xylene supplied to the first stage,
    which is maintained at a temperature at least 30 degrees centigrade lower than the temperature used in the first stage and at pressures of up to 30 atmospheres, whereby the oxidation is completed.

2. A process as claimed in claim 1, in which the amount of said catalysis salt is between 0.15% and 3.0%.

3. A process as claimed in claim 1, in which the alkali metal acetate is sodium acetate.

4. A process as claimed in claim 1, in which the second stage of reaction is carried out at 80° to 130° C.

5. A process for the catalytic oxidation of p-xylene to terephthalic acid which comprises partially oxidizing p-xylene in an initial reaction stage in the presence of a catalytic salt of cobalt or manganese at a temperature of 150° C. to 220° C. and at pressures of up to 30 atmospheres and completing the oxidation reaction in a second stage carried out at a temperature at least 30° C. lower than the first stage in the presence of methyl ethyl ketone, said methyl ethyl ketone being present in an amount of 1% to 15% by weight based on the weight of p-xylene admitted.

References Cited

UNITED STATES PATENTS

| | | |
|---|---|---|
| 3,240,803 | 3/1966 | Thompson et al. _____ 260—524 |
| 2,959,613 | 11/1960 | Whitfield _____ 260—524 |
| 3,387,027 | 6/1968 | Alagy. |

LORRAINE A. WEINBERGER, Primary Examiner

R. S. WEISSBERG, Assistant Examiner